(12) United States Patent
Winter et al.

(10) Patent No.: US 7,870,721 B2
(45) Date of Patent: Jan. 18, 2011

(54) GAS TURBINE ENGINE PROVIDING SIMULATED BOUNDARY LAYER THICKNESS INCREASE

(75) Inventors: Michael Winter, New Haven, CT (US); Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 749 days.

(21) Appl. No.: 11/595,040

(22) Filed: Nov. 10, 2006

(65) Prior Publication Data

US 2008/0112799 A1 May 15, 2008

(51) Int. Cl.
*F02K 3/02* (2006.01)
(52) U.S. Cl. .................... 60/226.1; 137/15.1
(58) Field of Classification Search ................ 60/204, 60/226.1, 772; 137/15.1; 244/53 B; 415/914
See application file for complete search history.

(56) References Cited

U.S. PATENT DOCUMENTS

| | | | |
|---|---|---|---|
| 2,915,262 A * | 12/1959 | Klein | ................ 244/74 |
| 3,222,863 A | 12/1965 | Klees et al. | |
| 3,568,694 A | 3/1971 | Johnson | |
| 3,664,612 A | 5/1972 | Skidmore et al. | |
| 4,044,973 A | 8/1977 | Moorehead | |
| 4,083,181 A | 4/1978 | Adamson | |
| 4,147,029 A | 4/1979 | Sargisson | |
| 4,722,357 A | 2/1988 | Wynosky | |
| 4,865,268 A | 9/1989 | Tracksdorf | |
| 4,899,958 A | 2/1990 | Horikawa | |
| 4,912,921 A | 4/1990 | Rice et al. | |
| 4,993,663 A | 2/1991 | Lahti et al. | |
| 5,000,399 A | 3/1991 | Readnour et al. | |
| 5,012,639 A | 5/1991 | Ream et al. | |
| 5,058,617 A | 10/1991 | Stockman et al. | |
| 5,127,222 A | 7/1992 | Ream et al. | |
| 5,143,329 A | 9/1992 | Coffinberry | |
| 5,145,126 A | 9/1992 | Patilla | |
| 5,177,957 A | 1/1993 | Grieb | |
| 5,261,227 A | 11/1993 | Giffin, III | |
| 5,284,012 A | 2/1994 | Laborie et al. | |
| 5,297,765 A | 3/1994 | Hughes et al. | |

(Continued)

FOREIGN PATENT DOCUMENTS

GB 1312619 4/1973

(Continued)

OTHER PUBLICATIONS

Extended European Search Report for Application No. 08252429.9 mailed Nov. 26, 2008.

(Continued)

*Primary Examiner*—Michael Cuff
*Assistant Examiner*—Phutthiwat Wongwian
(74) *Attorney, Agent, or Firm*—Carlson, Gaskey & Olds PC

(57) ABSTRACT

A nacelle assembly for a gas turbine engine includes a fan cowl disposed about an axis, a core cowl within the fan cowl and a bleed passage having an inlet that receives a bleed airflow and an outlet that discharges the bleed airflow in an upstream direction from the outlet. The bleed airflow is selectively introduced near a boundary layer of an inlet lip section of the fan cowl.

10 Claims, 4 Drawing Sheets

U.S. PATENT DOCUMENTS

| | | | |
|---|---|---|---|
| 5,351,476 A | | 10/1994 | Laborie et al. |
| 5,447,283 A | * | 9/1995 | Tindell ................ 244/207 |
| 5,586,431 A | | 12/1996 | Thonebe et al. |
| 5,593,112 A | | 1/1997 | Maier et al. |
| 5,743,488 A | | 4/1998 | Rolston et al. |
| 5,987,880 A | | 11/1999 | Culbetson |
| 6,055,805 A | * | 5/2000 | El-Aini et al. ............. 60/226.1 |
| 6,089,505 A | | 7/2000 | Gruensfelder et al. |
| 6,109,566 A | | 8/2000 | Miller et al. |
| 6,129,311 A | | 10/2000 | Welch et al. |
| 6,179,251 B1 | | 1/2001 | Tindell et al. |
| 6,260,567 B1 | | 7/2001 | Gruensfelder et al. |
| 6,334,753 B1 | | 1/2002 | Tillman et al. |
| 6,340,135 B1 | | 1/2002 | Barton |
| 6,360,989 B1 | | 3/2002 | Maguire |
| 6,379,110 B1 | | 4/2002 | McCormick et al. |
| 6,390,418 B1 | | 5/2002 | McCormick et al. |
| 6,651,929 B2 | | 11/2003 | Dionne |
| 6,655,632 B1 | | 12/2003 | Guptak et al. |
| 6,708,711 B2 | | 3/2004 | Surply et al. |
| 6,763,651 B2 | * | 7/2004 | Shmilovich et al. ...... 60/39.092 |
| 6,764,043 B2 | | 7/2004 | Sankrithi et al. |
| 6,971,229 B2 | | 12/2005 | Lair |
| 7,048,229 B2 | | 5/2006 | Sanders et al. |
| 7,090,165 B2 | | 8/2006 | Jones et al. |
| 7,131,612 B2 | | 11/2006 | Baptist et al. |
| 7,165,744 B2 | | 1/2007 | Howarth et al. |
| 7,617,670 B2 | * | 11/2009 | Truax et al. ................... 60/269 |

FOREIGN PATENT DOCUMENTS

| | | |
|---|---|---|
| GB | 1336724 | 11/1973 |
| GB | 1382809 | 2/1975 |

OTHER PUBLICATIONS

U.S. Appl. No. 11/584,030, filed Oct. 20, 2006, Morford, et al.
U.S. Appl. No. 11/739,216, filed Apr. 24, 2007, Jain, et al.
U.S. Appl. No. 11/749,260, filed May 16, 2007, Jain, et al.
U.S. Appl. No. 11/750,398, filed May 18, 2007, Jain, et al.
U.S. Appl. No. 11/772,287, filed Jul. 2, 2007, Jain, et al.
U.S. Appl. No. 11/679,749, filed Jun. 28, 2007, Jain, et al.

* cited by examiner

GAS TURBINE ENGINE PROVIDING SIMULATED BOUNDARY LAYER THICKNESS INCREASE

BACKGROUND OF THE INVENTION

This invention generally relates to a gas turbine engine, and more particularly to a nacelle inlet for a turbofan gas turbine engine.

In an aircraft gas turbine engine, such as a turbofan engine, air is pressurized in a compressor and mixed with fuel in a combustor for generating hot combustion gases. The hot combustion gases flow downstream through turbine stages and extract energy from the gas. In a two spool gas turbine engine, a high pressure turbine powers the high pressure compressor, while a low pressure turbine powers a fan section disposed upstream of the compressor and a low pressure compressor.

Combustion gases are discharged from the turbofan engine through a core exhaust nozzle and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust is provided from the combustion gases discharged through the core exhaust nozzle.

The fan section of a turbofan gas turbine engine may be geared to control the tip speed of the fan section. The ability to reduce the fan section tip speed results in decreased noise due to the fan section tip speed being lower than the low spool rotation speed. Controlling the fan section speed allows the fan section to be designed with a larger diameter, which further decreases noise. However, the nacelle of the turbofan engine must be large enough to support the large diameter fan section.

It is known in the field of aircraft gas turbine engines that the performance on the turbofan engine varies during diverse flight conditions experienced by the aircraft. An inlet lip section located at the foremost end of the turbofan nacelle is typically designed to enable operation of the turbofan engine and prevent the separation of airflow from the inlet lip section of the nacelle during diverse flight conditions. For example, the inlet lip section requires a "thick" inlet lip section design to support operation of the turbofan during specific flight conditions, such as cross-wind conditions, take-off and the like. Disadvantageously, the "thick" inlet lip section may reduce the efficiency of the turbofan engine during cruise conditions of the aircraft.

Accordingly, it is desirable to optimize the performance of a turbofan gas turbine engine during diverse flight requirements to provide a nacelle having a reduced thickness, reduced weight and reduced drag.

SUMMARY OF THE INVENTION

A nacelle assembly includes a fan cowl disposed about an axis, a core cowl within the fan cowl, and a bleed passage. The bleed passage includes an inlet which receives a bleed airflow and an outlet which discharges the bleed airflow in an upstream direction from the outlet. The bleed airflow is selectively introduced near a boundary layer of an inlet lip section of the fan cowl.

A gas turbine engine system includes a nacelle having a fan cowl and a core cowl, at least one compressor and at least one turbine, at least one combustor between the compressor and the turbine, a bleed passage, and a controller. The bleed passage includes an inlet for receiving a bleed airflow and an outlet that discharges the bleed airflow in an upstream direction from the outlet. The controller identifies an operability condition and selectively introduces the bleed airflow near a boundary layer of the inlet lip section in response to the operability condition.

A method of increasing an effective boundary layer of a gas turbine engine includes sensing an operability condition, and selectively introducing a bleed airflow in an upstream direction near the effective boundary layer of an inlet lip section of a nacelle of the gas turbine engine in response to sensing the operability condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
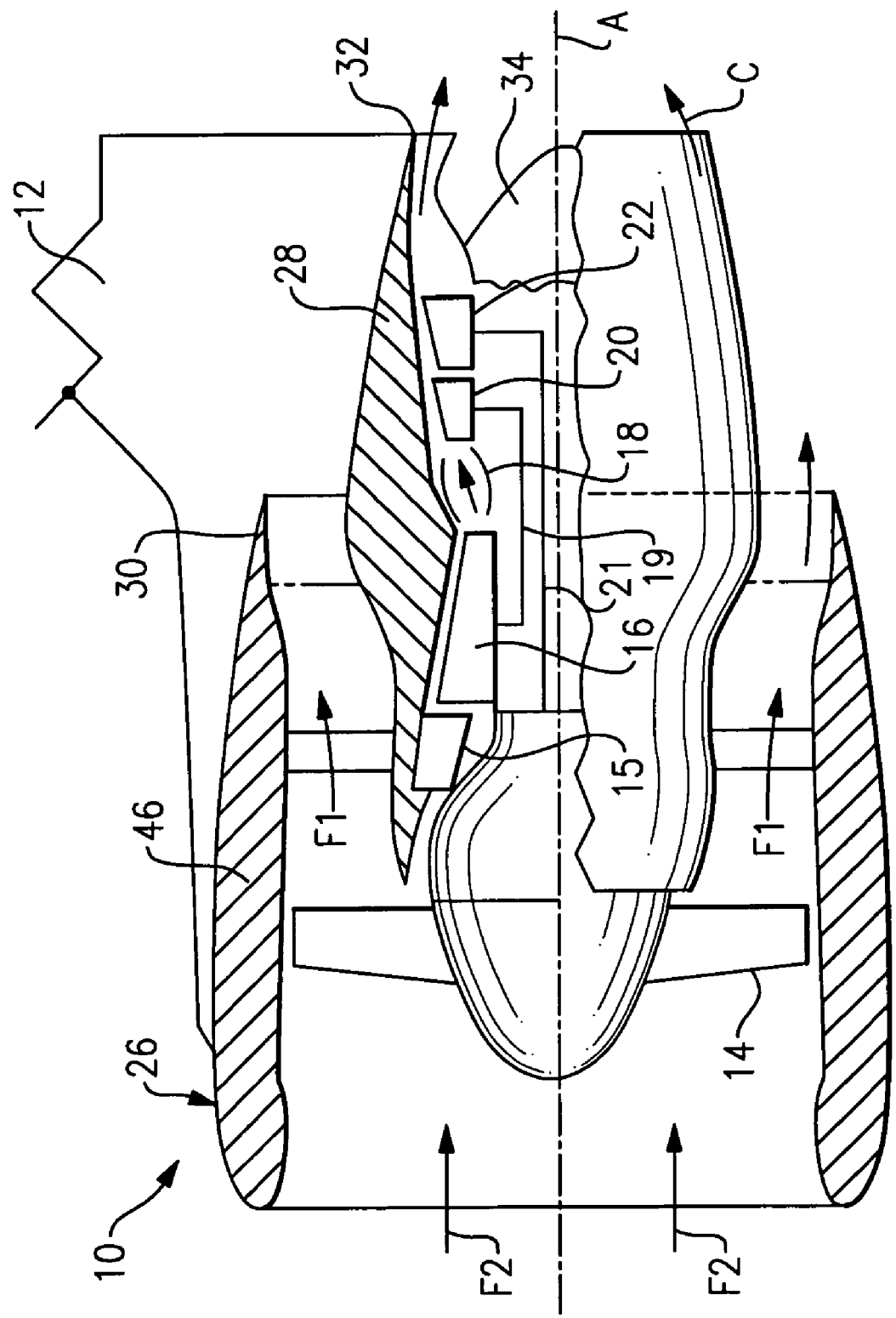
FIG. 1 illustrates a general perspective view of a gas turbine engine.

FIG. 1 illustrates a gas turbine engine 10 which includes (in serial flow communication) a fan section 14, a low pressure compressor 15, a high pressure compressor 16, a combustor 18, a high pressure turbine 20 and a low pressure turbine 22. During operation, air is pressurized in the compressors 15, 16 and mixed with fuel in the combustor 18 for generating hot combustion gases. The hot combustion gases flow through the high and low pressure turbines 20, 22, which extract energy from the hot combustion gases. The high pressure turbine 20 powers the high pressure compressor 16 through a high speed shaft 19 and a low pressure turbine 22 powers the fan section 14 and the low pressure compressor 15 through a low speed shaft 21. The invention is not limited to the two spool axial gas turbine architecture described and may be used with other architectures, such as a single spool axial design, a three spool axial design and other architectures.

The gas turbine engine 10 is in the form of a high bypass ratio turbofan engine mounted within a nacelle assembly 26, in which most of the air pressurized by the fan section 14 bypasses the core engine itself for the generation of propulsion thrust. The nacelle assembly 26 includes a fan cowl 46 and a core cowl 28 within the fan cowl 46. The fan cowl 46 and the core cowl 28 define outer flow surfaces of the nacelle assembly 26.

Discharge airflow F1 is discharged from the engine 10 through a fan exhaust nozzle 30 defined radially between the core cowl 28 and the fan cowl 46. Core exhaust gases C are discharged from the core engine through a core exhaust nozzle 32 defined between the core cowl 28 and a center plug 34 disposed coaxially therein around a longitudinal centerline axis A of the gas turbine engine 10.

Figure 2:
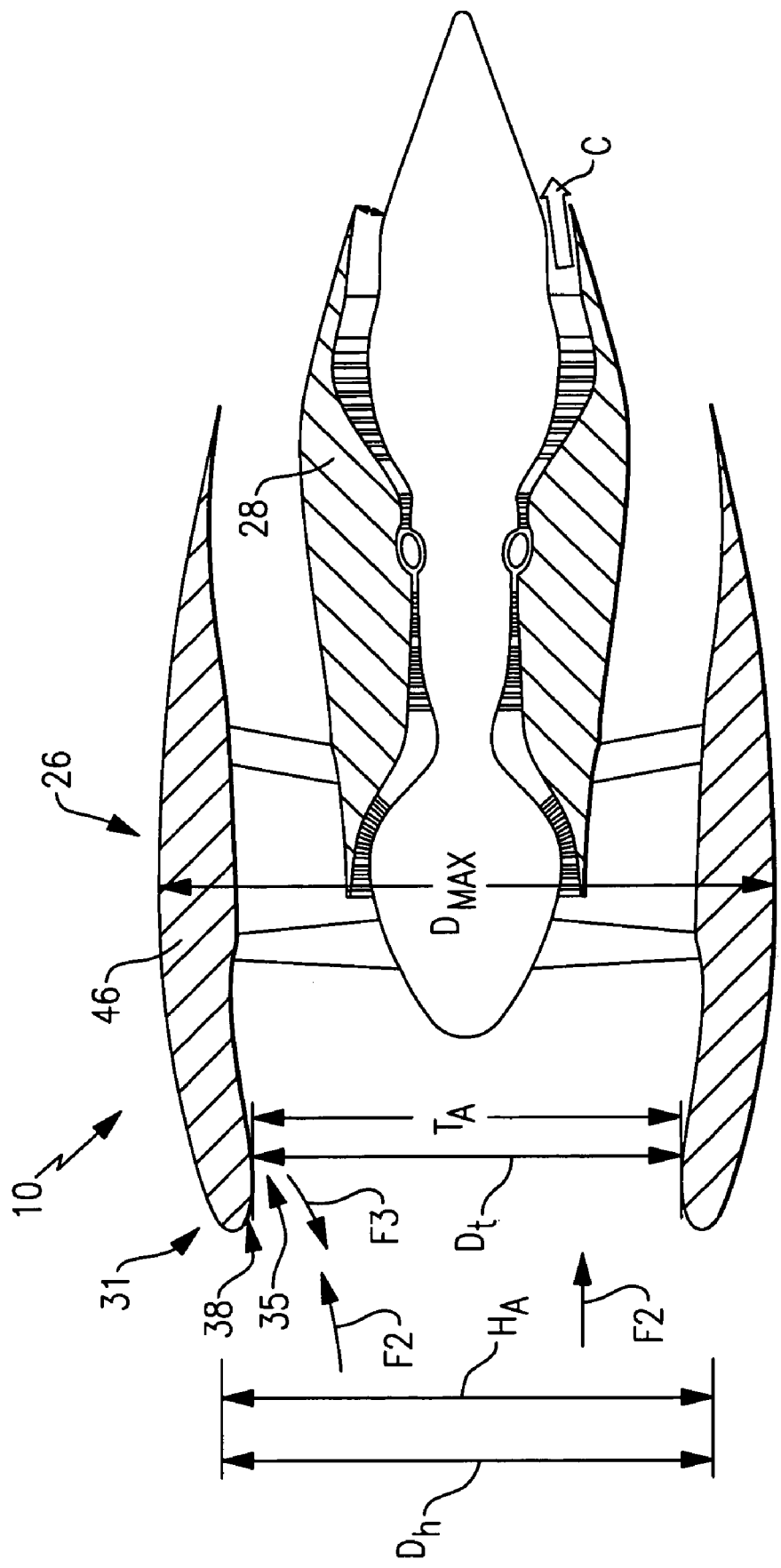
FIG. 2 illustrates a boundary layer of an inlet lip section of the gas turbine engine illustrated in FIG. 1.

FIG. 2 illustrates an example inlet lip section 38 of the nacelle assembly 26. The inlet lip section 38 is positioned near a forward segment 31 of the fan cowl 46. A boundary layer 35 is associated with the inlet lip section 38. The boundary layer 35 represents an area adjacent to a flow surface of the inlet lip section 38 where the velocity gradient of airflow is zero. That is, the velocity profile of incoming airflow F2 goes from a free steam away from the boundary layer 35 to near zero at the boundary layer 35.

The nacelle assembly 26 also defines a contraction ratio. The contraction ratio represents a relative thickness of the inlet lip section 38 of the nacelle assembly 26 and is represented by the ratio of a highlight area $H_a$ (ring-shaped area defined by a highlight diameter $D_h$) and a throat area $T_a$ (ring-shaped area defined by throat diameter $D_t$) of the nacelle assembly 26. Current industry standards typically use a contraction ratio of approximately 1.300 to prevent the separation of the incoming airflow F2 from the fan cowl 46, but other contraction ratios may be feasible. "Thick" inlet lip section designs, which are associated with large contraction ratios, increase the maximum diameter Dmax and increase weight and the drag penalties associated with the nacelle assembly 26.

Increasing the thickness of the boundary layer 35 of the inlet lip section 38 during specific flight conditions slows the flow of incoming airflow F2 around inlet lip section 38, thereby simulating a "thick" inlet lip section 38 and enabling the nacelle assembly 26 to be designed with a reduced contraction ratio. In one example, the increased boundary layer 35 thickness is achieved by introducing a bleed airflow F3 at the boundary layer 35 of the inlet lip section 38 during the specific flight conditions, as is further discussed below.

Figure 3:
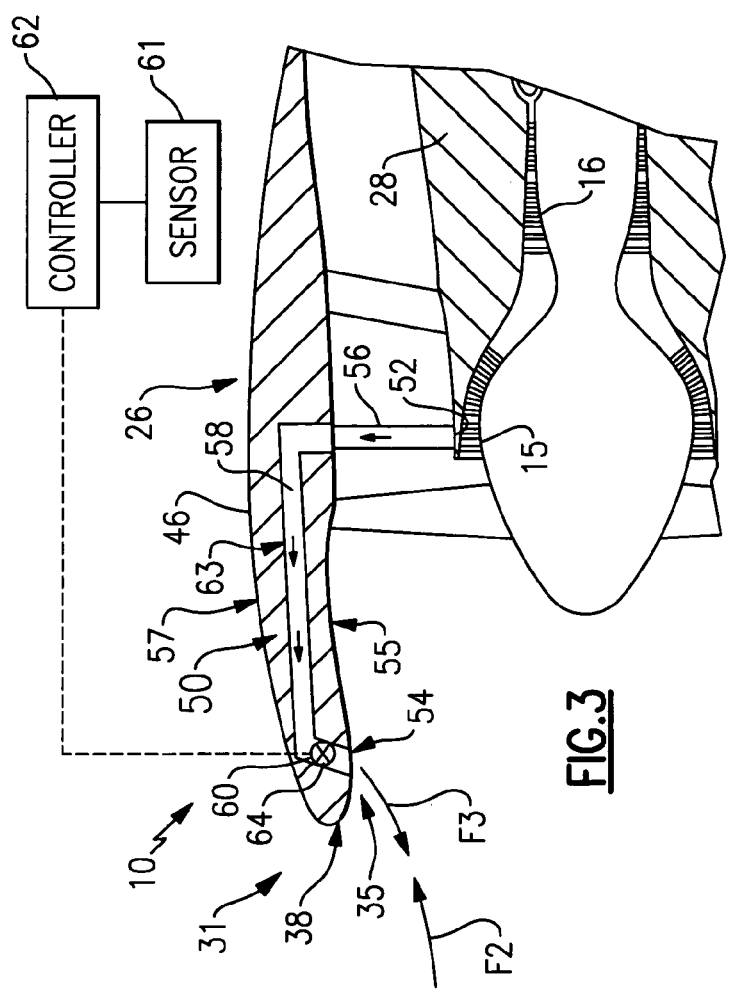
FIG. 3 illustrates a bleed passage of a gas turbine engine system shown in FIG. 1.

FIG. 3 illustrates an example bleed passage 50 of the gas turbine engine 10. The bleed passage 50 provides the bleed airflow F3 to the boundary layer 35 of the inlet lip section 38. The bleed passage 50 includes an inlet 52 for receiving the bleed airflow F3 and an outlet 54 for discharging the bleed airflow F3 near the boundary layer 35. In one example, the inlet 52 receives the bleed airflow from the lower pressure compressor 15. In another example, the inlet 52 receives the bleed airflow F3 from the high pressure compressor 16. It should be understood that the inlet 52 of the bleed passage 50 may receive the bleed airflow F3 from any location of the gas turbine engine 10.

Figure 4:
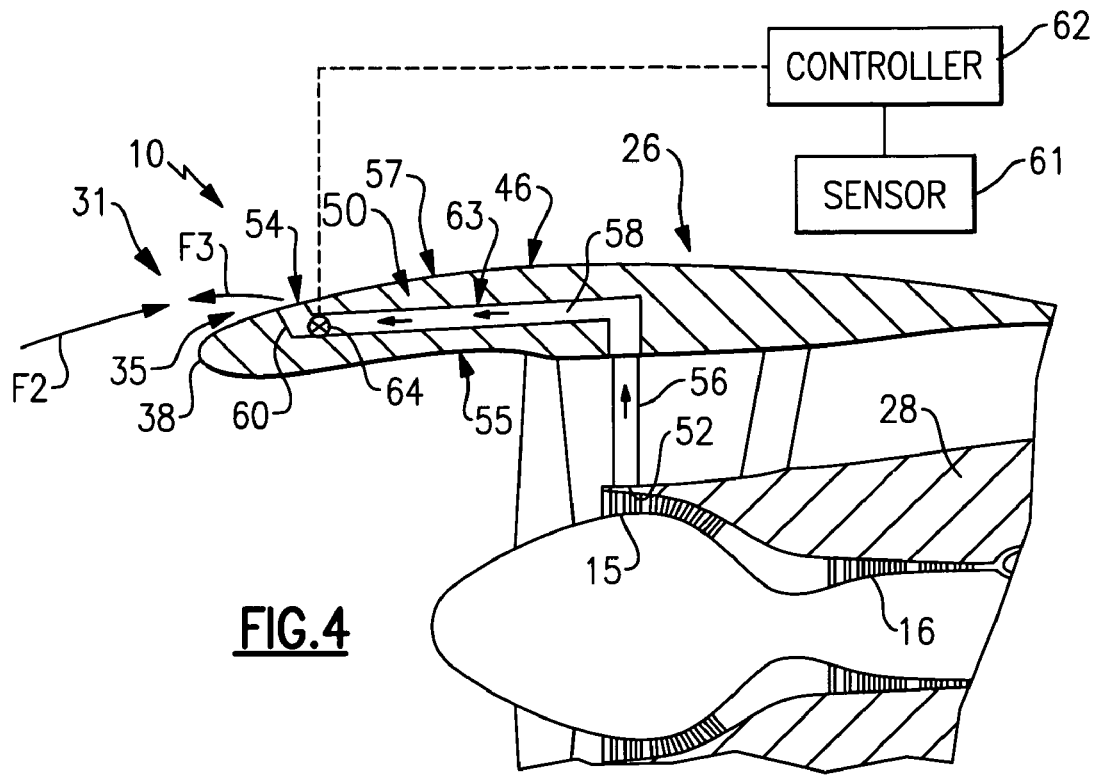
FIG. 4 illustrates another embodiment of the bleed passage of the gas turbine engine illustrated in FIG. 1.

In one example, the bleed airflow F3 is introduced at an interior wall 55 of the fan cowl 46 (See FIG. 3). In another example, the bleed airflow F3 is introduced at an exterior wall 57 of the fan cowl 46 (See FIG. 4). In yet another example, the bleed airflow F3 is introduced at both the interior wall 55 and the exterior wall 57 of the fan cowl 46 (See FIG. 5). It should be understood that bleed airflow F3 may be introduced anywhere along the nacelle assembly 26.

The bleed passage 50 includes a plurality of conduit sections 56, 58 and 60. In the illustrated examples shown in FIGS. 3-5, the conduit section 56 extends from the low pressure compressor section 15, through the core cowl 28, and through the fan cowl 46 of the nacelle assembly 26. The conduit section 58 extends within a cavity 63 within the fan cowl 46 of the nacelle assembly 26. The conduit section 60 extends between the conduit section 58 and the outlet 54 of the bleed passage 50. A worker of ordinary skill in the art having the benefit of this disclosure would be able to implement the conduit sections 56-60 of the bleed passage 50 within the existing structure of the gas turbine engine 10.

Figure 6:
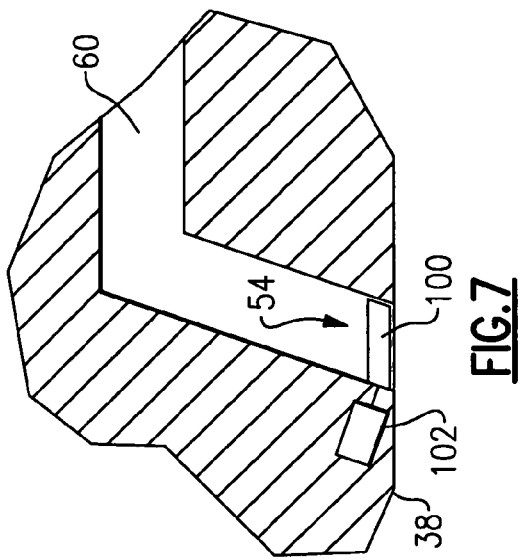
FIG. 6 illustrates a schematic view of a "thick" inlet lip section simulation.

The bleed airflow F3 is introduced at the boundary layer 35 in an upstream direction from the outlet 54. In one example, the bleed airflow F3 is introduced at the boundary layer 35 of the inlet lip section 38 in a direction directly opposite of the direction of the incoming airflow F2. Therefore, the incoming airflow F2 is forced to flow around the bleed airflow F3 being introduced at the boundary layer 35, thereby simulating a "thick" inlet lip section as required during certain flight conditions (See FIG. 6). In the disclosed embodiment, since the bleed airflow F3 is taken from the compressor 15, it will be at a relatively high pressure. In another example, the bleed airflow F3 is introduced at an angle relative to the incoming airflow F2. The actual direction and angle that the bleed airflow F3 is introduced at the boundary layer 35 will vary depending upon design specific parameters including, but not limited to, the size of the nacelle assembly 26 and the actual flight condition being experienced by the aircraft.

The increased thickness of the boundary layer 35 is achieved by introducing the bleed airflow F3 at the boundary layer 35 in response to a detected operability condition. A valve 64 is positioned within the bleed passage 50 and is controlled to selectively introduce the bleed airflow F3 at the boundary layer 35, in one example. In another example, the valve 64 is positioned directly adjacent to the outlet 54.

It should be understood that the bleed passages are not shown to the scale they would be in practice. Instead, they are shown larger than in practice to better illustrate their function. A worker in this art would be able to determine an appropriate bleed volume for a particular application, and the size of the bleed passages. Also, while a single outlet 54 is shown, of course, plural outlets would be spaced circumferentially such that the "thick" lip function occurs around the entire lip.

A sensor 61 detects the operability condition and communicates with a controller 62 to open the valve 64 and introduce the bleed airflow F3 at the boundary layer 35. Of course, this view is highly schematic. It should be understood that the sensor 61 and the controller 62 may be programmed to detect any known flight condition. Also, the sensor 61 can be replaced by any control associated with the gas turbine engine or an associated aircraft. In fact, the controller 62 itself can generate the signal to cause the actuation of the valve 64.

Figure 7:
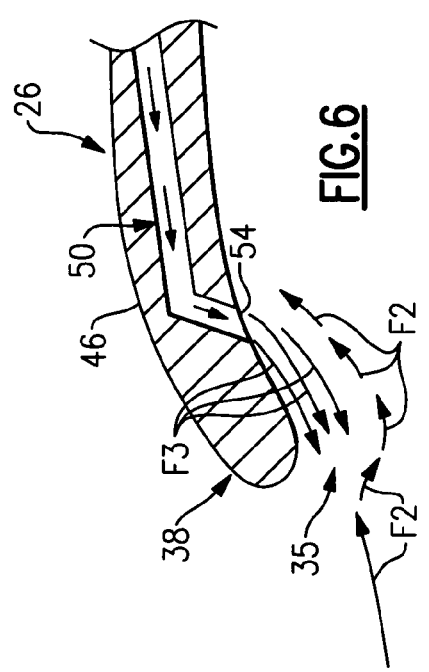
FIG. 7 shows another embodiment of the bleed passage.
Figure 5:
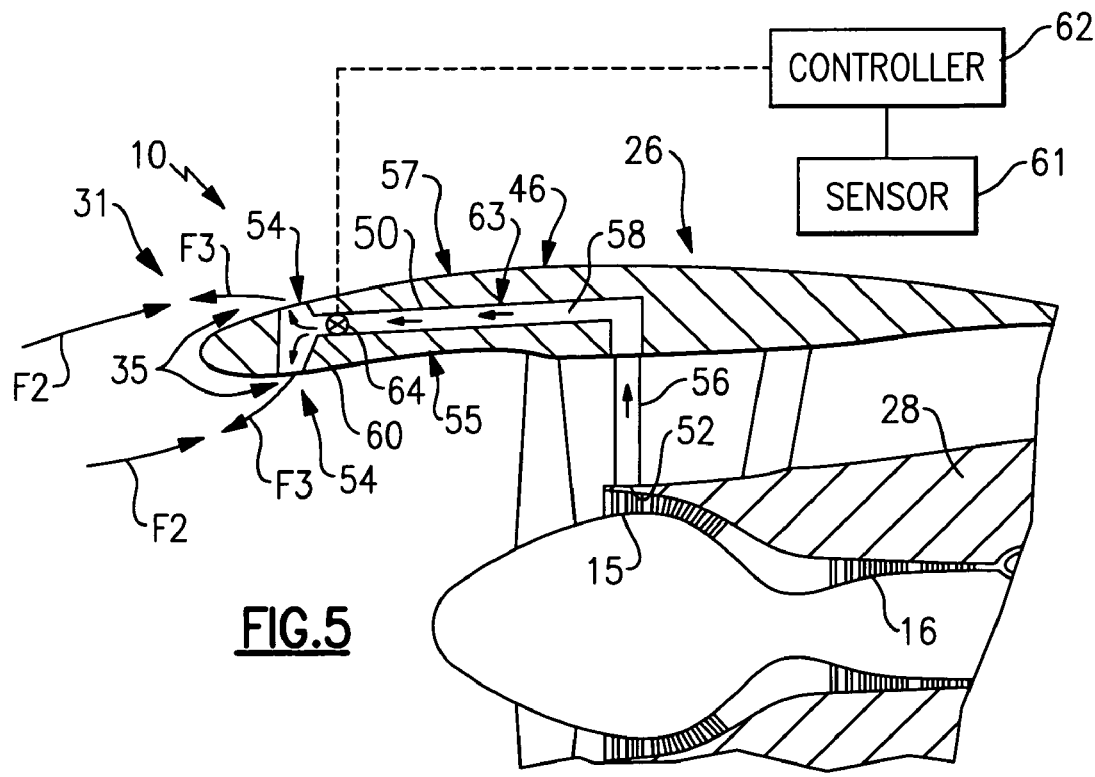
FIG. 5 illustrates yet another embodiment of the bleed passage of the gas turbine engine shown in FIG. 1.

In another example, shown in FIG. 7, the outlet 54 of the bleed passage 50 includes a flap assembly 100 which is pivotable about the outlet 54 to control the amount of bleed airflow F3 introduced at the inlet lip section 38. Of course, FIG. 5 is a schematic view. A person of ordinary skill in the art would know how to design appropriate actuation 102 and control systems to achieve comparable results with an alternative bleed passage design.

In one example, the operability condition includes a take-off condition. In another example, the operability condition includes a climb condition. In another example, the operability condition includes a crosswind condition. Crosswind conditions are experienced during takeoff as an aircraft travels down the runway (i.e., where the aircraft experiences airflow in a roughly perpendicular direction with respect to the movement of the aircraft down the runway). In yet another example, the operability condition includes a windmilling condition. A windmilling condition occurs when an engine of a multi-engine aircraft losses functionality or is otherwise shut down (i.e., an engine-out condition). The damaged engine is advantageously permitted to rotate, and is driven by an airflow resulting from the forward velocity of the aircraft (i.e., the damaged engine is permitted to "windmill"). It should be understood that the bleed airflow F3 may be introduced during any operability condition experienced by an aircraft during operation.

The controller 62 closes the valve 64 of the bleed passage 50 during normal cruise operation (e.g., a generally constant speed at generally constant, elevated altitude) of the aircraft. By simulating a "thick" inlet lip section during specific flight conditions, the aircraft may be designed having a "thin" inlet lip section 38 (i.e., a reduced contraction ratio is achieved). Therefore, efficiency is improved during normal cruise conditions. Further, by increasing the boundary layer 35 thickness of the inlet lip section 38 during diverse flight conditions, performance of the gas turbine engine 10 is maximized during each specific operability condition. As a result, the nacelle assembly 26 is designed per cruise conditions of the aircraft. A reduced maximum diameter of the nacelle assembly 26 may therefore be achieved while reducing weight, reducing fuel burn and increasing the overall efficiency of the gas turbine engine 10.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A nacelle assembly, comprising:
a fan cowl disposed about an axis;
a core cowl at least partially within said fan cowl;
a low pressure compressor stage and a high pressure compressor stage disposed within said core cowl; and
a bleed passage at least partially disposed within said fan cowl and having an inlet that receives a bleed airflow and an outlet that discharges said bleed airflow in an upstream direction from said outlet, wherein said bleed airflow is selectively communicated from a location separate from the high pressure compressor stage and introduced through an interior wall of said fan cowl near a boundary layer of an inlet lip section of said fan cowl.

2. The assembly as recited in claim 1, wherein said bleed airflow is discharged from said outlet in a direction having at least a component in a direction opposite that of an incoming airflow.

3. The assembly as recited in claim 2, wherein said bleed airflow is discharged from said outlet at a non-parallel angle relative to said direction of incoming airflow.

4. The assembly as recited in claim 1, wherein a valve is positioned adjacent said outlet and is selectively actuable to introduce said bleed airflow near said boundary layer of said inlet lip section.

5. The assembly as recited in claim 4, wherein said valve includes at least one flap assembly pivotally attached to said outlet and actuable to introduce said bleed airflow near said boundary layer of said inlet lip section.

6. The assembly as recited in claim 4, wherein a control monitors operability conditions of a gas turbine engine receiving said nacelle assembly and controls said valve based upon said operability conditions.

7. The assembly as recited in claim 1, wherein said bleed passage includes structure to tap airflow from a compressor section of a gas turbine engine that is to include said nacelle assembly.

8. The assembly as recited in claim 1, wherein said bleed airflow is introduced through both of said interior wall and an exterior wall of said fan cowl.

9. A nacelle assembly, comprising:
a fan cowl disposed about an axis;
a core cowl at least partially within said fan cowl;
a bleed passage having an inlet that receives a bleed airflow and an outlet that discharges said bleed airflow in an upstream direction from said outlet, wherein said bleed airflow is selectively introduced near a boundary layer of an inlet lip section of said fan cow; and
a valve positioned adjacent said outlet, wherein said valve includes at least one flap assembly pivotally attached to said outlet and actuable to introduce said bleed airflow near said boundary layer of said inlet lip section.

10. A nacelle assembly, comprising:
a fan cowl disposed about an axis;
a core cowl at least partially within said fan cowl;
a bleed passage at least partially disposed within said fan cowl and having an inlet that receives a bleed airflow and an outlet that discharges said bleed airflow in an upstream direction from said outlet, wherein said bleed airflow is selectively introduced through an interior wall of said fan cowl near a boundary layer of an inlet lip section of said fan cowl; and
a valve is positioned adjacent said outlet and is selectively actuable to introduce said bleed airflow near said boundary layer of said inlet lip section; wherein said valve includes at least one flap assembly pivotally attached to said outlet and actuable to introduce said bleed airflow near said boundary layer of said inlet lip section.

* * * * *